United States Patent [19]
Morita et al.

[11] 4,382,563
[45] * May 10, 1983

[54] SEAT BELT WINDING AND RETRACTING APPARATUS

[75] Inventors: Masayuki Morita, Tokoname; Takashi Kawaharazaki, Ichinomiya; Toshiaki Shimogawa, Nishio, all of Japan

[73] Assignee: Nippon Soken, Inc., Nishio, Japan

[ * ] Notice: The portion of the term of this patent subsequent to Jan. 12, 1999, has been disclaimed.

[21] Appl. No.: 831,046

[22] Filed: Sep. 6, 1977

Related U.S. Application Data

[63] Continuation-in-part of Ser. No. 787,534, Apr. 14, 1977, which is a continuation of Ser. No. 656,850, Feb. 10, 1976, abandoned.

[30] Foreign Application Priority Data

| Feb. 18, 1975 | [JP] | Japan | 50-20673 |
| Aug. 9, 1975 | [JP] | Japan | 50-96771 |
| Aug. 9, 1975 | [JP] | Japan | 50-96775 |
| May 18, 1977 | [JP] | Japan | 52-57172 |

[51] Int. Cl.³ ............... A62B 35/02; B65H 75/48
[52] U.S. Cl. ............... 242/107; 242/107.4 R; 180/268; 180/270; 280/807
[58] Field of Search ............... 242/107–107.7; 280/801–808; 297/475–478; 180/268–270

[56] References Cited

U.S. PATENT DOCUMENTS

| 2,159,004 | 5/1939 | Bosch | 242/107.7 |
| 3,007,653 | 11/1961 | Becker | 242/107.5 |
| 3,301,503 | 1/1967 | Browning | 242/107 |
| 3,337,155 | 8/1967 | Binding | 242/107 |
| 3,384,321 | 5/1968 | Becker et al. | 242/107.5 |
| 3,880,364 | 4/1975 | Andres | 242/107.4 R |
| 3,929,210 | 12/1975 | Cutler et al. | 242/107 X |
| 3,952,966 | 4/1976 | Burleigh | 242/107.4 R |
| 3,957,223 | 5/1976 | Colasanti et al. | 242/107.4 R |
| 3,984,063 | 10/1976 | Knierieman | 242/107.4 R X |
| 4,002,219 | 1/1977 | Steinmann | 242/107.4 R X |
| 4,026,494 | 5/1977 | Tanaka | 242/107.4 R X |

FOREIGN PATENT DOCUMENTS 2606293 9/1976 Fed. Rep. of Germany ...... 242/107

Primary Examiner—John M. Jillions
Attorney, Agent, or Firm—Cushman, Darby & Cushman

[57] ABSTRACT

A seat belt winding apparatus for a vehicle comprises a winding reel and spring means having one end connected to the winding reel and the other end connected to a stationary part of the apparatus. The spring means is constituted by two spiral springs connected to each other though an interposed ratchet gear rotatably mounted on a stationary part of the apparatus. There is provided for controlling rotation of the ratchet gear controlling means which includes a pawl adapted to releasably engage with the ratchet gear, electro-magnetic means for selectively actuating the pawl and a switch which responds to the states of the vehicle to selectively energize the electro-magnetic actuator means, thereby to control the combined force of the first and second springs in dependence on whether the pawl is engaged with the ratchet gear or not and hence in dependence upon the prevailing states of the vehicle.

4 Claims, 9 Drawing Figures

SEAT BELT WINDING AND RETRACTING APPARATUS

CROSS REFERENCE TO THE RELATED APPLICATION

The present invention is a continuation-in-part of applicants' copending application, Ser. No. 787,534 filed on Apr. 14, 1977 which is a continuation of the applicants' earlier application Ser. No. 656,850 filed on Feb. 10, 1976 now abandoned.

BACKGROUND OF THE INVENTION

1. Field of the Invention

The present invention relates in general to an apparatus for winding up automatically a seat belt used in a vehicle to protect occupant and in particular to a mechanism for controlling the force for winding up or retracting the seat belt.

2. Description of the Prior Art

In hitherto known seat belt winding or retracting apparatus, a spiral spring is employed which has one end connected to a belt winding shaft and the other end fixedly connected to a stationary part of the winding apparatus through an accommodating box or case in which the seat belt is stored. When the seat belt is pulled outwardly from the apparatus by occupant in the vehicle to be bound around the body of occupant for protection, the spring is increasingly tensioned to store spring energy as the belt is paid out. Such stored energy is utilized for automatically winding up or retracting the seat belt into the apparatus when the occupant puts off the binding belt. The hitherto known type seat belt winding apparatus as described above has been disadvantageous in that excessively great binding force is applied to the occupant who thus has uncomfortable feeling and is restricted considerably in his movement, since the spring force applied to the seat belt is increased as the belt is pulled out to be put on the occupant. This is particularly true in the case where the lap belt is formed integrally with a shoulder belt and the winding apparatus is installed on the side of the shoulder belt. Such disadvantage may be eliminated by employing a spring having a correspondingly reduced spring force. However, the spring force for winding up the seat belt for storage will then become insufficient to retract the belt smoothly and rapidly.

SUMMARY OF THE INVENTION

An object of the invention is therefore to eliminate the disadvantage of the hitherto known seat belt winding apparatus.

Another object of the invention is to provide a seat belt winding apparatus in which the force of spring for winding up the seat belt is controllably varied in dependence on the states of vehicle or behavior of occupant in the vehicle.

Still another object of the invention is to provide a seat belt winding apparatus which permits occupant to put on comfortably the seat belt for the protection and safety purpose.

With above objects in view, there is provided according to an aspect of the invention a seat belt winding apparatus which comprises winding-up spring means including first and second springs and having one end securedly connected to a frame, a winding reel supported rotatably on the frame and operatively connected to the spring means so that the winding reel can wind up thereon the seat belt under influence of at least one of the first and second springs, electro-magnetic clutch means operatively connected between the first and second springs and adapted to be changed over between first and second operating states to thereby control combined force of the first and second springs, and switch means for actuating the clutch means, whereby force for winding up the seat belt is varied in dependence upon the states taken by the clutch means.

BRIEF DESCRIPTION OF THE DRAWINGS

The above and other objects, features and advantages of the invention will become more apparent from description of preferred embodiments taken in conjunction with the accompanying drawings, in which.

DETAILED DESCRIPTION OF THE PREFERRED EMBODIMENTS

Figures 1, 2:
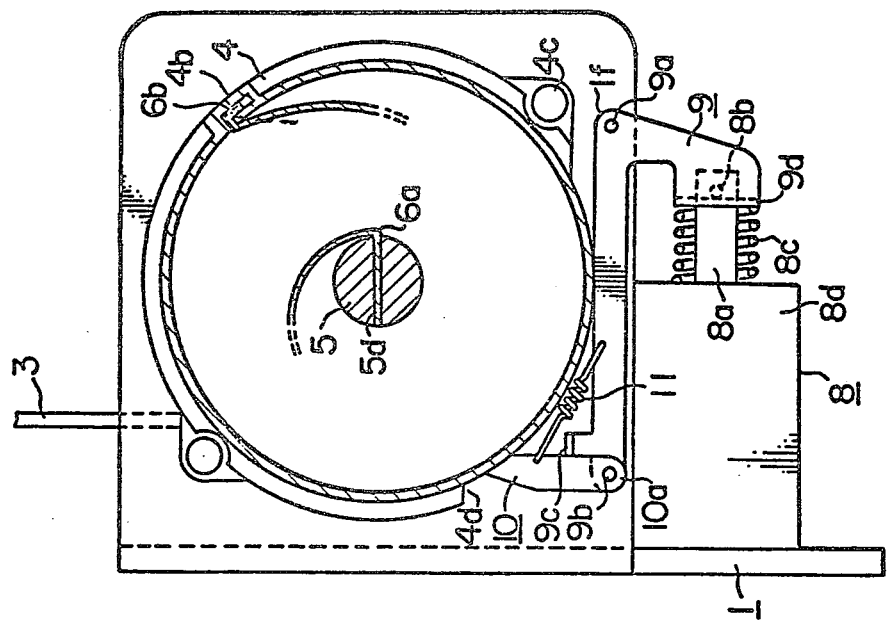
FIG. 1 shows in a front view a seat belt winding apparatus according to a first embodiment of the invention with some parts removed and some parts shown in section.
FIG. 2 is a cross-sectional view of the same taken along the line II—II and viewed in the direction indicated by arrows in FIG. 1.

Referring first to FIGS. 1 to 5, a seat belt retracting and winding apparatus according to a first embodiment of the invention comprises a frame 1 which is formed of a thick steel plate by press work or the like so as to have a substantially U-like cross-section. The frame 1 is thus composed of side walls 1a and 1b and a base portion 1g. The latter is formed with a hole 1c through which the frame 1 can be fixedly secured to an appropriate location such as a suitable portion on a floor of the vehicle by suitable means such as a clamping bolt. Formed in the side walls 1a and 1b of the frame 1 are openings at positions opposite to each other which serve to support rotatably a winding reel 2 through bush bearings 1d and 1e formed of a low friction material such as Teflon. The winding reel 2 comprises a shaft 2a, flanges 2b and 2c and a hub portion 2d which will be described in detail hereinafter. It will be readily appreciated that the shaft 2a is rotatably supported by the bush bearings 1d and 1e thereby to allow the rotation of the reel 2, as described above.

A belt 3 is fixedly connected to the shaft 2a at one end thereof so that the belt 3 can be wound around the shaft 2a between the side flanges 2b and 2c. Further, it should be mentioned that uni-directional gears (not shown) which are permitted to be rotated only in one direction are disposed adjacent and opposite to the outer peripheries of the flanges 2b and 2c. Upon occurrence of an emergency, the uni-directional gears are adapted to be engaged by lock means (not shown) to stop the rotation of the winding reel 2, thereby to inhibit the belt 3 from being further paid out. The belt 3 may be of any conventional type such as a webbing and has the one end portion fixedly secured to the shaft 2a of the reel 2 as described above, while the other end of the belt 3 is provided with a lock or latch means such as tongue which is adapted to be releasably connected to a counterpart lock means such as a buckle (not shown) anchored to an associated seat of the vehicle.

There is further provided a casing 4 for accommodating therein spring means. The casing 4 is formed of a resin or like material in a cup-like configuration having an aperture 4d (FIG. 2). The casing 4 is secured onto the side wall 1b of the frame 1 at mounting portions 4c thereof (FIG. 2). Formed in the casing 4 is a central opening 4a which serves as a bearing for retatably supporting a ratchet gear 5 constituting a part of control means for controlling variably the belt winding force. A first spring member 6 which will also be described in detail hereinafter is secured to a mounting portion 4b (FIG. 2) and accommodated within the spring casing 4. The ratchet gear 5 is of a disk-like configuration having a laterally projecting annular peripheral portion formed with ratchet teeth 5a and is disposed within the spring casing 4 as supported by the bearing portion 4a formed in the casing 4 at one side and the reduced hub portion 2d of the shaft 2 received in a counterbore formed in a shaft portion 5b at the other side. The ratchet gear 5 is preferably formed integrally with the shaft portion 5b to serve for winding therearound the first spring member 6 which may be of any conventional type such as a vortex-like or spiral spring and has an outer end portion 6b secured to the mounting portion 4b of the casing 4 with the inner end portion 6a being secured to the shaft portion 5b of the ratchet gear 5 as inserted into a slit 5d formed in the shaft portion 5b, as can be best seen from FIG. 2.

Figure 3:
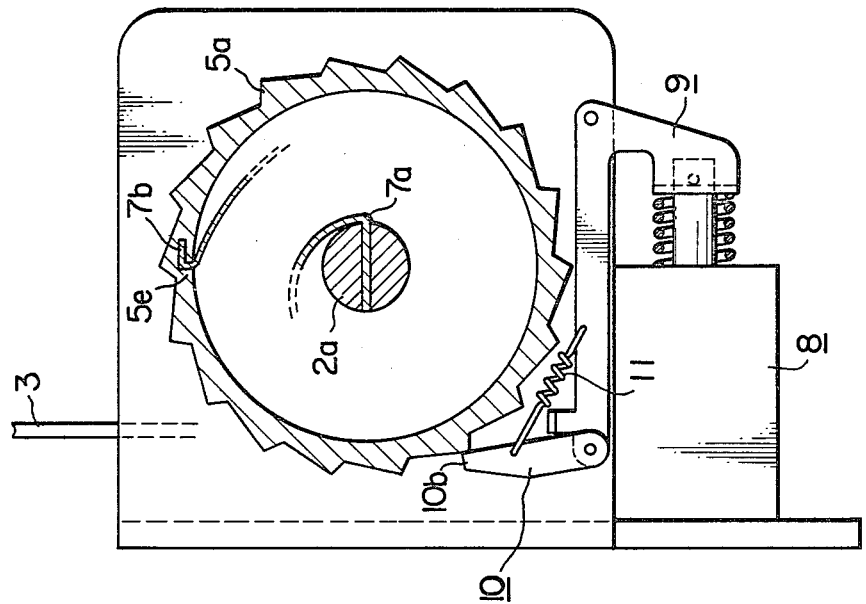
FIG. 3 shows in a partially sectioned view an arrangement of a ratchet gear, a ratchet and electro-magnetic actuator means constituting a control part of the seat belt winding apparatus shown in FIG. 1.

A second spring member 7 of a suitable type such as a vortex-like or spiral spring is accommodated within a cylindrical cavity defined by the inner wall of the laterally projecting peripheral portion of the ratchet gear 5. The spring force of the second spring member 7 is selected smaller than that of the first spring member 6. The second spring member 7 has an outer end portion 7b fixedly secured to the outer peripheral portion of the ratchet gear 5 at 5e as shown in FIG. 3, while the inner end portion 7a of the second spring member 7 is securedly inserted into a slit 2e formed in the shaft 2a, as shown in FIG. 3. In this manner, the first and second spring members 6 and 7 are connected in series to each other through the ratchet gear 5.

Referring particularly to FIG. 2, reference numeral 8 denotes an electro-magnetic solenoid device of a conventional type which is fixedly mounted on the base portion 1g of the frame 1 and adapted to actuate a pawl 10. To this end, the solenoid device 8 comprises a plunger 8a, a driving pin 8b, a return spring 8c and a solenoid coil 8d. The pawl 10 is operatively coupled to the solenoid device 8 through an actuation lever 9 which is pivotally mounted on the base portion 1g of the frame 1 by means of a supporting stud shaft 1f which extends through a bearing aperture 9a to support the actuation lever 9 rotatably. The actuation lever 9 has a first arm extending downwardly as viewed in FIG. 2 and pivotally connected to the driving pin 8b of the solenoid device 8 with the return spring 8c being interposed between the solenoid coil 8d and the opposite end 9d of the first arm of the lever 9. The other or a second arm of the actuation lever 9 which extends substantially horizontally as viewed in FIG. 2 has a stud 9b secured at the free end portion thereof and adapted to support rotatably the pawl 10. A stopper 9c is formed in the second lever arm so as to restrict the pivotal movement of the pawl 10 to a predetermined angular range. The pawl 10 which is pivotally supported on the stud 9b through a bearing 10a has a free end adapted to engage selectively with the teeth 5a of the ratchet gear 5 (refer to FIG. 3). A biasing spring 11 is provided to urge constantly the pawl 10 in a clockwise direction relative to the actuation lever 9. Thus, the pawl 10 is usually in contact with the stopper 9c formed in the actuation lever 9 in the stationary state, as can be seen from FIG. 2.

Figure 5:
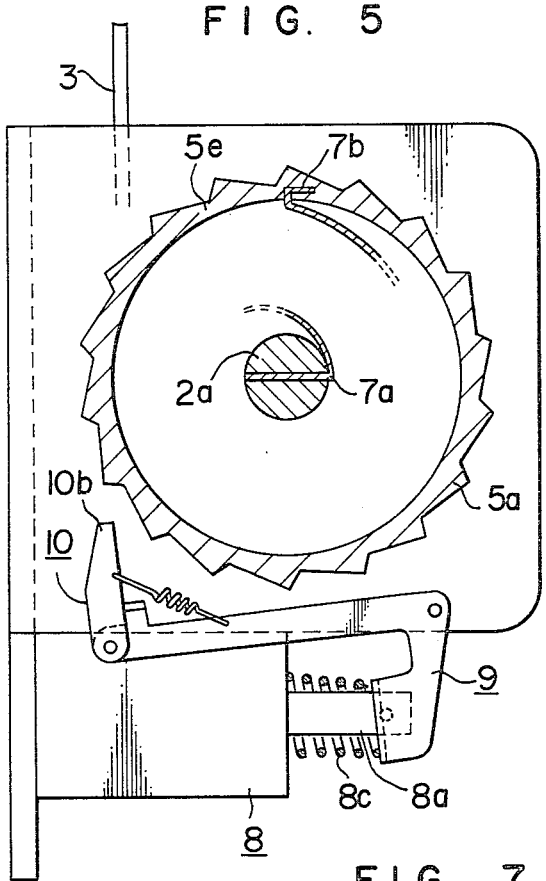
FIG. 5 is a similar view to FIG. 3 showing the arrangement in another operating state.

As will be appreciated from the foregoing description, the solenoid device 8 and the actuation lever 9 will cooperate to constitute a control mechanism for the ratchet gear 5 which serves to releasably combine the first and the second spring members 6 and 7. In more particular, when the solenoid device 8 is electrically energized, the plunger 8a is moved to the left as viewed in FIG. 2 to revolve the actuation lever 9 in the clockwise direction about the supporting stud 1f, which results in the engagement between the pawl 10 and one of the gear teeth 5a (FIG. 3), thereby to inhibit the rotation of the ratchet gear 5 in the counter clockwise direction. On the other hand, when the solenoid device 8 is electrically deenergized, the free end 10b of the pawl 10 is disengaged from the teeth 5a of the ratchet gear 5, thereby to allow the gear 5 to be rotated freely, as is shown in FIG. 5. In this connection, it will be noted that such disengagement of the pawl 10 is brought about by the spring force of the return spring 8c which causes the actuation lever 9 to be rotated in the counter-clockwise direction.

Next, description will be made of a control circuit for the solenoid device 8 by referring to FIG. 6. The solenoid coil 8d of the solenoid device 8 is connected to a power source 14 constituted by a battery installed on the vehicle through switches 12 and 13. The switch 12 is interlinked with a parking/emergency brake system (not shown) of the vehicle to detect the operating states thereof and adapted to be opened when the parking/emergency brake is applied, while closed upon release of the parking/emergency brake. The switch 13 is constituted by a conventional ignition switch. It will thus be understood that the solenoid coil 8d is electrically energized only when both of the parking/emergency brake switch 12 and the ignition switch 13 are closed.

Now, operation of the seat belt retracting and winding apparatus of the structure described above will be explained. So long as the parking/emergency brake switch 12 is opened in response to the application of the parking/emergency brake, the solenoid device 8 will remain in the deenergized state. As a result, the pawl 10 is in the state disengaged from the ratchet gear 5 as shown in FIG. 5, thereby to permit the ratchet gear 5 to be freely rotated. In this state, tension of the first spring member 6 is applied to the winding reel 2, while the second spring member 7 is maintained in an essentially compressed state under the tension exerted by the first spring member 6. The belt 3 is wound around the winding-up reel 2. This situation will occur when a passenger or occupant has not taken a ride in the vehicle or when the occupant in the vehicle has not yet bound himself by the seat belt 3.

Figure 4:
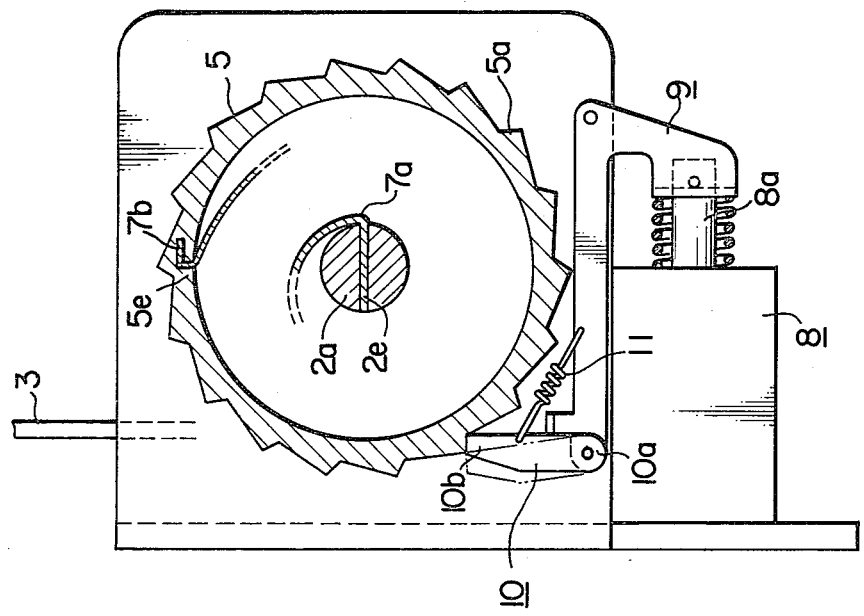
FIG. 4 is a similar view to FIG. 3 showing the arrangement in a different operating state.

When the seat belt 3 is withdrawn by the occupant, the belt 3 is paid out from the winding reel 2 with the first spring member 6 being progressibly tensioned. The belt 3 thus paid out is then connected to a fixed buckle or anchor member around the occupant. Release of the parking/emergency brake upon starting of the vehicle gives rise to the closing of the switch 12. When the ignition switch 13 has been already in the closed state at that time, the coil 8d of the solenoid device 8 is electrically energized, whereby the pawl 10 is brought into engagement with one of the teeth 5a of the ratchet gear 5 to break the operative combination between the first and second spring members 6 and 7. The attracting force of the solenoid device 8 is selected sufficiently great so as to inhibit the rotation of the ratchet gear 5 in the counter-clockwise direction (belt winding-up direction). On the other hand, rotation of the ratchet gear 5 in the clockwise direction (belt paying-out direction) is permitted even in the energized state of the solenoid device 8, since the pawl 10 is slidable along the toothed outer peripheral portion of the ratchet gear 5 against the force of the compression spring 11 as is shown in FIG. 4. In other word, the belt 3 can be paid out from the winding reel 2 depending on behaviors taken by the occupant due to the possibility of rotation of the ratchet gear 5 in the counter-clockwise direction. In this state, tension of the first spring member 6 is prevented from being applied onto the winding reel 2, while the tension of the second spring member 7 which is smaller than that of the first spring 6 is applied to the winding reel 2, thereby to reduce the binding force of the seat belt 3 applied to the occupant.

The retraction or winding of the seat belt on the winding reel 2 is carried out in the following manner. When the parking/emergency brake is applied, the switch 12 is then opened to break the current supply to the coil 8d of the solenoid device 8, resulting in that the control mechanism comprising the actuation lever 9 is restored to the state shown in FIG. 5 under the influence of the return spring 8c and due to the tendency of the ratchet gear 5 to rotate in the counter-clockwise direction. The ratchet gear 5 thus becomes in the position to freely rotate in the counter-clockwise direction, which in turn releases abruptly the first spring member 6 from the highly tensioned state. The first spring member 6 is thus relaxed with the second spring member 7 in turn being increasingly tensioned to the state in which the forces of the first and the second springs are balanced with each other. This balanced state in which the second spring member 7 is in a substantially completely compressed state will produce the highest tension under the influence of which the seat belt 3 can be wound rapidly and smoothly onto the winding reel 2, thereby to assure a positive winding-up operation without failure.

In the belt paying-out operation, it may happen that the ratchet gear 5 would be in such a position (dotted line position) slightly deviated from the solid line position shown in FIG. 3, wherein the free end of the pawl 10 stickingly bears against a tooth crest of the ratchet gear 5 so that the energized solenoid coil 8d can not attract the plunger 8a fully. Even in such case, since the tension of the belt 3 is not reduced, the ratchet gear 5 is rotated as the belt 3 is paid out so that the pawl 10 will soon come to the position completely engaged with a tooth of the ratchet gear 5 as is represented by the solid line position in FIG. 3. In this connection, it is to be noted that the attracting force of the solenoid device 8 in the state in which the plunger 8b is fully pulled is several times as great as the initial attraction. Thus, a positive engagement between the pawl 10 and a tooth of the ratchet gear 5 can be assured. Further, since the arrangement is made such that the full engagement between the pawl and a tooth of the gear 5 may be attained when the solenoid plunger has been completely attracted, the initial attraction of the solenoid may be of a relatively small magnitude. This means that the solenoid device 8 may be implemented in a relatively decreased size with the manufacturing costs being correspondingly reduced.

In the case of the first embodiment as described above, it has been assumed that the parking/emergency brake switch is used in combination with the ignition switch. However, it will be appreciated that the apparatus can be operated satisfactorily only with the parking/emergency brake switch. Besides, so far as the operating states of the vehicle inclusive of the stationary state can be detected, any detecting means may be employed in place of the parking/emergency brake switch. Furthermore, although the electrical actuator means such as the solenoid device has been described as used in combination with the parking/emergency brake switch, it is also possible to use any other suitable means such as a conventional flexible wire, e.g. choke wire for transmitting displacement of the parking/emergency brake mechanically and directly to the ratchet.

Next, a second exemplary embodiment of the seat belt retracting and winding apparatus will be described with reference to FIGS. 7 to 9.

Figure 7:
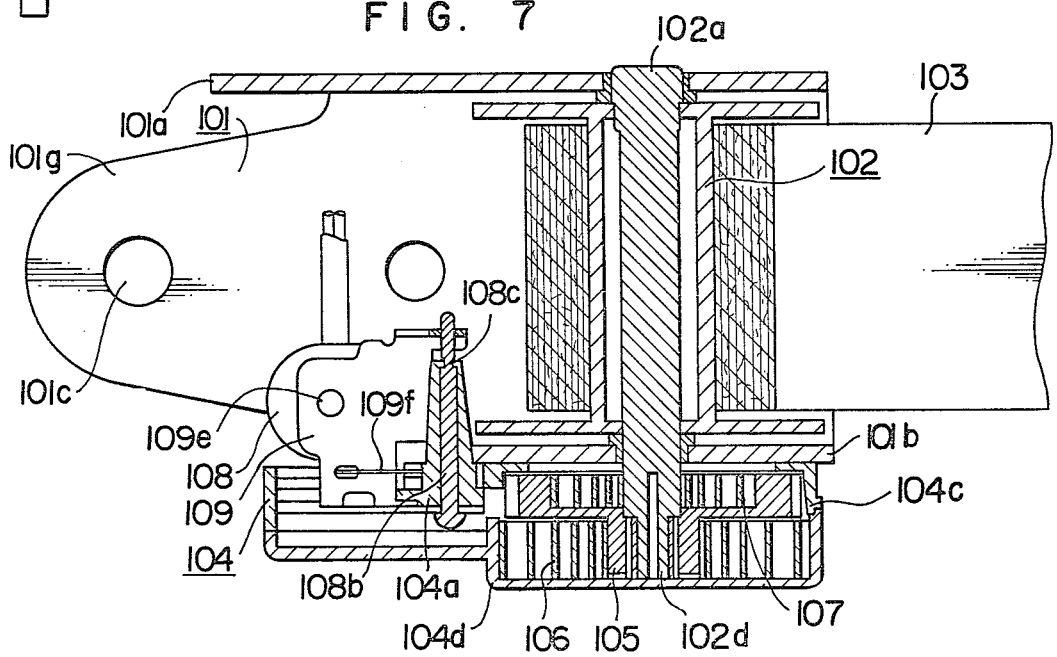
FIG. 7 shows in a front view a seat belt winding apparatus according to a second embodiment of the invention with some parts removed and some part shown in section.
Figure 8:
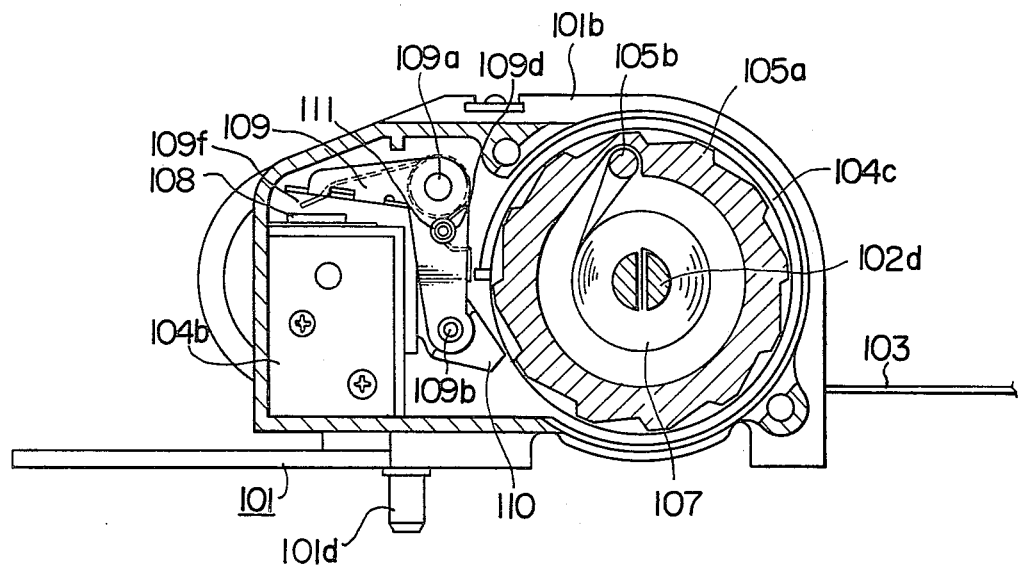
FIG. 8 is a partially sectional side view of the same.
Figure 9:
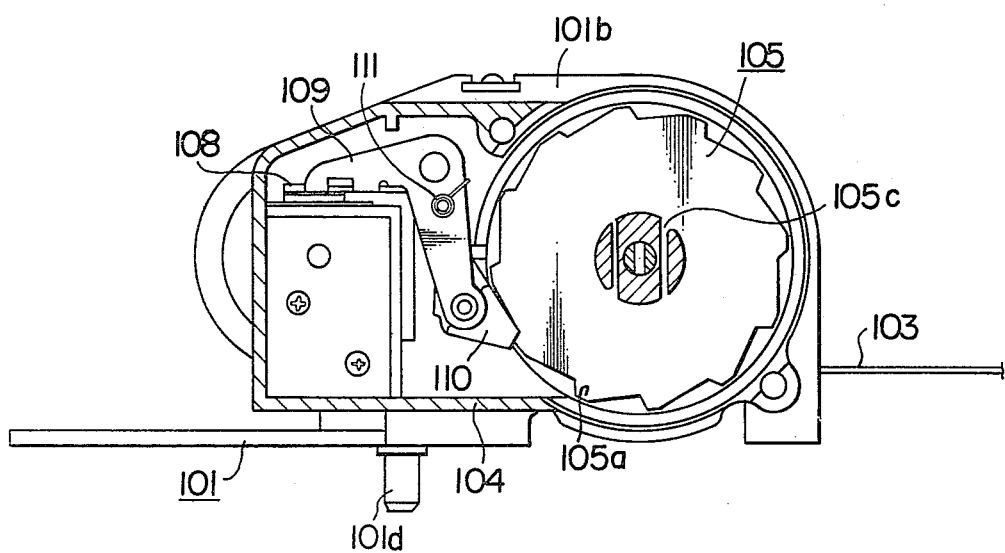
FIG. 9 is a side view of the same with some parts shown in section.

Referring to FIGS. 7 to 9, the apparatus includes a frame 101 having side walls 101a and 101b and a base portion 101g. The latter is formed with a hole 101c as is similar to the first embodiment. The frame 101 is adapted to be fixedly installed onto a vehicle floor at an appropriate location. With a view to preventing the apparatus from being inclined after the installation, a stopper pin 101d is provided which is inserted into a stationary part of the vehicle body. A casing 104 as well as a spring case 104d are adapted to be mounted on the side wall 101b of the frame 101. The casing 104 comprises a pin securing post 104a, an electro-magnetic coil mount 104b, a ratchet gear casing portion 104c and so forth. The pin securing post 104a is formed of a resilient material integrally with the casing 104 and has a longitudinally extending through-hole into which a pin 108b is snugly inserted from the lower side as viewed in FIG. 7. The pin 108b is formed with a groove 108c at the level corresponding to the height of the post 104a, so that the material of the post 104a at the top portion thereof will engage into the groove 108c thereby to securedly mount the pin 108b. The electro-magnetic or solenoid coil mount 104b serves to fixedly support a solenoid coil or an electro-magnetic coil 108 described hereinafter. A ratchet gear 105 is in a form of a disk having a laterally extending outer peripheral portion formed with a unidirectional gear teeth 105a which is adapted to be housed in the rachet gear casing portion 104c. With a view to facilitating the assembly of the spring case 104d, the ratchet gear casing portion 104c has a profile to allow the spring casing 104d to be snugly mounted thereon. A second spring 107 is accomodated within a cavity defined by the laterally extending peripheral toothed portion of the ratchet gear 105 and has an inner end unremovably inserted into a longitudinal slit formed in a shaft 102a of a winding reel 102, while the outer end portion of the spring 107 is bent with an appropriate curvature radius so as to be held frictionally by a support or a pin 105b. A pair of slits 105c which serve to fixedly receive the inner end portion of a first spring member 106 described hereinafter are formed in a hub portion 102d of the winding reel 102 in eccentrical positions opposite to each other as is shown in FIG. 9. By virtue of such arrangement, the mounting of the inner end portion of the first spring member 6 can be easily carried out. In assembling, by angularly displacing the spring casing 104d for 90° at maximum, the inner end portion of the first spring member can be readily inserted into either one of the paired slits 105c. The spring casing 104d is secured to the side wall 101b of the frame 101 together with the casing 104 by means of screws and serves to accommodate therein the first spring member 106 with the outer end portion thereof being secured to the inner peripheral wall of the casing 104d. The spring casing 104d has such an outer peripheral configuration that it may be snugly fitted around the casing 104. An actuator means 109 is rotatably supported by the pin 108b at two points and is composed of a pole portion 109e to be attracted by the electro-magnetic coil 108, an opening 109a through which the pin 108b extends to support the actuator means 109 rotatably thereabout, a shaft 109b for supporting a ratchet 110 rotatably in a predetermined angular range, and an opening in which one end of a return spring 111 for the pawl 110 is fixedly inserted. The pin 108b which is secured in the pin mounting post 104a as described hereinbefore is adapted to pivotally support the actuator means 109 at both ends. The groove 108c formed in the pin 108b and engaged compressively by the material of the post 104a prevents the pin 108b from being inadvantently removed. The electro-magnetic coil 108 is secured to the mount 104b formed in the casing 104 by means of screws.

When the electro-magnetic coil 108 is energized in response to an electro signal, a magnetic circuit is completed through the pole portion 109e of the actuator means 109 which is then attracted to a core of the coil 108, thereby to rotate the actuator means 109. A torsion spring 109f is mounted on the pin securing post 104a with one end thereof being secured to the casing 104 while the other end resiliently abutts the actuator means 109. When the coil 108 is deenergized, the spring 109f urges the actuator means 109 in the clockwise direction, as viewed in FIG. 8. The return spring 111 suspended between the opening 109d of the actuator means 109 and the pawl 110 resiliently urges the latter toward the position shown in FIG. 8.

In the following description about the operations of the apparatus shown in FIGS. 7 to 9, it is assumed that the detection switch which triggers the operation is constituted by a buckle switch in place of the parking/emergency brake switch described hereinbefore in connection with the first embodiment shown in FIGS. 1 to 6. The term "buckle switch" means such switch which is adapted to be closed, when a lock means such as a tongue secured to the free end of the seat belt as paid out from the winding apparatus is meshed with a buckle anchored to a vehicle seat or the like. In the following description, reference numeral 12 is attached to the buckle switch since it corresponds to the switch 12 of FIG. 6.

When a belt 103 is accommodated within the belt winding apparatus as wound on the winding reel 102, the buckle switch 12 is opened since the lock or latch means such as the tongue is released from the anchored buckle. The electro-magnetic coil 108 remains thus in the deenergized state. Consequently, the pawl 110 is held in the state shown in FIG. 8 (coupling state), wherein the ratchet gear 105 is rotatable and the winding reel 102 is applied with spring force from the first spring 106. Due to the fact that the force of the first spring 106 is selected greater than that of the second spring 107, the latter is in a substantially completely compressed state under the influence of the first spring 106.

When the seat belt 103 is pulled outwardly with the tension of the first spring member 106 being progressively increased and the locking tongue connected to the free end of the belt is meshed with the anchored buckle, the buckle switch 12 is closed. When the ignition coil such as shown in FIG. 6 has been already closed, the electro-magnetic coil 111 is energized, resulting in that the pawl 110 meshes with a tooth 105a of the ratchet gear 105 (this state is referred to as the disconnected state). Since the electromagnetic coil 108 is so designed that the induced attracting force thereof is of a sufficiently large magnitude for inhibiting the rotation of the ratchet wheel 105 in the clockwise direction, the rotation of the latter in the clockwise direction is inhibited. On the other hand, the rotation of the ratchet gear 105 in the counter-clockwise direction is permitted even in the energized state of the electro-magnetic coil, because the pawl 110 is switchably slidable along the toothed periphery of the ratchet gear 105 against the force of the return spring 111. In other words, even after the tongue of the seat belt 103 has been locked to the anchored buckle (not shown) with the belt 103 extending around the body of occupant in the vehicle, the belt 103 can be pulled outwardly in dependence on behaviors or attitudes of the occupant, since the ratchet gear 105 can be freely rotated in the counter-clockwise direction. Furthermore, because the first spring 106 is no more effective for the winding reel 102 which is thus only under the influence of the second spring, the tension exerted to the seat belt 103 will become significantly reduced, after the belt 103 has been applied to the occupant.

When the tongue is released from the buckle by the occupant to put off the seat belt 103, the buckle switch is opened to deenergize the electro-magnetic coil 108. The control mechanism including the actuator means 109 is thus returned to the starting state shown in FIG. 8 under the action of the restoring spring 109f. The ratchet gear 105 can now be rotated freely in the clockwise direction and consequently the second spring 107 is rapidly relaxed to the state where the forces of the first and the second springs 106 and 107 are balanced relative to each other. In this state, the combined tension of both springs becomes highest under which the belt 103 is rapidly wound on the reel 102 to be stored within the retracting apparatus.

In the apparatus described above, the means which detects the prevailing condition in the vehicle and triggers the operation is constituted by the parking/emergency brake switch which responds to the actuation of the parking/emergency brake system or the buckle switch sensitive to the states of the belt locking means.

However, it will be self-explanatory that many other types of detecting switches can be employed for the same purpose.

For example, it is conceivable that contacts are provided in a speed meter of a vehicle in such arrangement that the contacts are in the off state so far as the vehicle speed is in the range of 0 to 5 km/h and closed when the speed exceeds 5 km/h.

As another example, the operating states of engine and transmission may be utilized to determine whether the operation of the above described belt winding apparatus is to be allowed or not. For example, revolution number of the engine may be detected by a conventional tacho-meter the output of which is utilized to open the switch described above in the range of revolution number of 0 r.p.m. to 500 r.p.m. and close it in the range of 500 r.p.m. to 1000 r.p.m. To the same effect, operation frequency of an interrupter of distributor for an ignition device can be made use of. Besides, negative pressure in a suction manifold of engine may be detected to actuate the trigger switch. In a similar manner, the generated voltage of an alternator installed on the vehicle can be utilized for controlling the switch operation.

Figure 6:
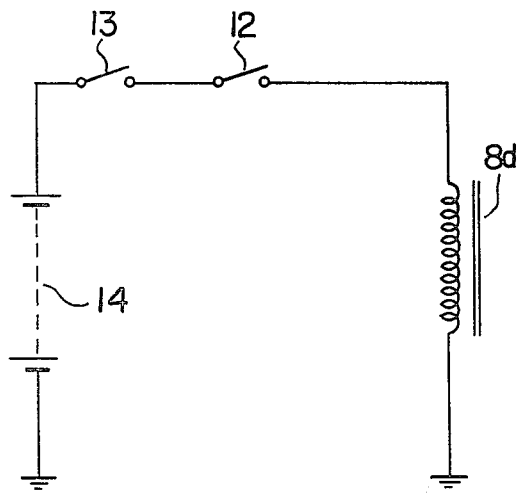
FIG. 6 is a circuit diagram showing an electric control circuit which can be employed in an implementation of the invention.

Furthermore, the switch 12 shown in FIG. 6 may be constituted by a door switch which is so arranged as to be closed and opened in response to the closing and opening of a vehicle door, respectively. Of course, the relation between the switch operation and the door manipulation may be reversed. In such case, an inverter circuit may be required to be provided for inverting the signal polarity or alternatively the solenoid device may be modified so as to be operated in the reversed manner.

Additionally, the switch may be constituted by a seat switch which is positioned in a seat of vehicle and closed when occupant sit down thereon. Alternatively, a similar switch may be disposed in the back portion of the seat so that the switch 12 may be operated upon being pressed by the back of the occupant.

Besides, although electrical actuator means such as the solenoid device has been described as used in combination with a trigger or detector switch, it is of course possible to use any other types of suitable means as inclusive of mechanical actuator means such as a conventional flexible wire.

What is claimed is:

1. A seat belt winding and retracting apparatus comprising:
   a frame,
   winding-up spring means connected to said frame and including first and second springs,
   a winding reel supported rotatably on said frame and operatively connected to said spring means so that said winding reel can wind up thereon the seat belt under influence of at least one of said first and second springs,
   coupling means operatively connected between said first and second springs for changing between coupling and uncoupling states to thereby change seat belt winding force influenced by said first and second springs, and
   means for actuating said coupling means,
   whereby force for winding up said seat belt is varied in dependence upon the states taken by said coupling means.

2. An apparatus as set forth in claim 1, wherein said coupling means comprises:
   a ratchet gear disposed between and serving to connect said first and second springs to each other,
   pawl means including a pawl secured to said frame and adapted to engage with said ratchet gear, and
   means adapted to be selectively activated to bring said pawl into engagement with said ratchet gear.

3. An apparatus as set forth in claim 1, wherein said first and second springs are constituted by spiral springs which spiral in like helical sense.

4. An apparatus as set forth in claim 1, wherein said first and second springs are constituted by spiral springs.

* * * * *